United States Patent
Yang

(10) Patent No.: US 8,226,506 B2
(45) Date of Patent: *Jul. 24, 2012

(54) CONTINUOUS VARIABLE TRANSMISSION DEVICE WITH LOW SHIFT TRANSMISSION PULLEY TRAIN

(76) Inventor: Tai-Her Yang, Dzan-Hwa (TW)

( * ) Notice: Subject to any disclaimer, the term of this patent is extended or adjusted under 35 U.S.C. 154(b) by 563 days.

This patent is subject to a terminal disclaimer.

(21) Appl. No.: 12/320,388

(22) Filed: Jan. 26, 2009

(65) Prior Publication Data
US 2009/0197716 A1    Aug. 6, 2009

Related U.S. Application Data

(60) Provisional application No. 61/006,829, filed on Feb. 1, 2008.

(51) Int. Cl.
*F16H 59/00* (2006.01)

(52) U.S. Cl. .................. 474/12; 474/17; 474/50; 474/70

(58) Field of Classification Search .................... 474/12, 474/17, 50, 70, 100, 109
See application file for complete search history.

(56) References Cited

U.S. PATENT DOCUMENTS

| 4,881,925 A * | 11/1989 | Hattori | 474/18 |
| 4,884,997 A * | 12/1989 | Hattori | 474/28 |
| 7,803,075 B2 * | 9/2010 | Ho | 474/8 |

* cited by examiner

*Primary Examiner* — Sang Kim
(74) *Attorney, Agent, or Firm* — Bacon & Thomas, PLLC

(57) ABSTRACT

A continuously variable transmission device with a low shift transmission pulley train includes a unidirectional transmission device installed between the input shaft and output shaft of the continuously variable transmission device. During high load operation, when a rotating speed of the driving pulley of the low shift transmission pulley train is lower than that of the input shaft in the same rotating direction, the rotational kinetic energy of the input shaft is transmitted through the unidirectional transmission device and the low shift transmission pulley train to drive the output shaft and further to drive the load.

12 Claims, 4 Drawing Sheets

CONTINUOUS VARIABLE TRANSMISSION DEVICE WITH LOW SHIFT TRANSMISSION PULLEY TRAIN

BACKGROUND OF THE INVENTION

The relates to a continuously variable transmission device of the type having driving and driven pulleys on different shafts, and in particular to a continuously variable transmission in which the spacing between V-belt grooves of the driving and driven pulleys is modulated, thereby changing the radius of the belt at the driving pulley or driven pulley to change the transmission speed ratio between the driving pulley and the driven pulley, the spacing modulation being driven by one or more than one kind of axial driving force, as follows:

1. by using a variable centrifugal force generation mechanism to change the rotational speed of the input shaft and generate a variable axial driving force that changes the spacing of the transmission V-belt grooves of the driving pulley;

2. by using a variable centrifugal force generating mechanism to change the rotational speed of the output shaft and generate a variable axial driving force that changes the spacing of the transmission V-belt grooves of the driven pulley;

3. by using a variable axial driving force generating mechanism to change the output shaft torque and generate a variable axial driving force that changes the spacing of the transmission V-belt grooves of the driving pulley;

4. by using a variable axial driving force generating mechanism to change the output shaft torque and generate a variable axial driving force that changes the spacing of the transmission V-belt grooves of the driven pulley; and/or 5. by providing the driving or driven pulley with an axial pre-pressed spring and pulling the driving or driven pulley using a belt type transmission component to generate an axial driving force that changes the variable spacing of the transmission V-belt grooves of both or either of the driving or driving pulley.

The above five methods of varying the groove spacing in a continuously variable transmission involve passive operations. Alternatively, the groove spacing may be actively varied by a linear driving force that is generated manually, or by mechanical power, electromagnetic effect, a hydraulically or pneumatically driven linear driving device; or revolving kinetic energy generated by an electric motor, hydraulic motor or pneumatic motor, and that is converted through a mechanical transmission device into an axial linear type driving force to change the spacing of the variable spacing transmission V-belt grooves of both or either of the driving pulley or driven pulley.

Such a continuously variable transmission device may have numerous different input and output shaft structures, including: rubber belt type, metal belt type, chain type, electronic (ECVT) type, and friction disk type.

SUMMARY OF THE INVENTION

A continuously variable transmission device includes a low shift transmission pulley train passively operated by an axial driving force generated by an operating torque or rotational speed, controlled manually or by axially pre-pressed springs on the driving and driven pulleys, or actively operated by applying manual, electric, mechanical, hydraulic or pneumatic power with reference to input preset operating modes, detected speeds and torques, etc., to thereby modulate and operate the speed ratio of the continuously variable transmission.

This arrangement solves a number of problems with conventional different-shaft-type continuously variable transmissions. Although such continuously variable transmission devices are advantageous in that they are convenient to operate because of the ability to automatically adjust the speed ratio according to a rotational speed change of the driving pulley input shaft and the size of loading torque at the loading side, the different-shaft-type continuously variable transmission device also has the following imperfections:

1. Due to low transmittable power, it is only suitable for middle to small power applications;

2. Transmission efficiency of the continuously variable transmission device of different shafts type is too low; and 3. Durability enhancement is required.

The continuously variable transmission device of the invention overcomes these disadvantages by providing a low shift transmission pulley train with a fixed speed ratio in the same revolving direction and an attached unidirectional transmission device installed between the input shaft and output shaft of the continuously variable transmission device, such that if a decelerating type continuously variable transmission device operated at a maximum or near maximum decelerating speed ratio, or an accelerating type continuously variable transmission device is operated at a minimum near minimum accelerating speed ratio, then during high load operation, when the rotational speed of the driving pulley of the low shift transmission pulley train is lower than that of the input shaft in the same revolving direction, the revolving kinetic energy of the input shaft is transmitted through the unidirectional transmission device and the low shift transmission pulley train to drive the output shaft and further to drive the load, at which time the power originally transmitted through the continuously variable transmission device is instead transmitted through the low shift transmission pulley train.

DESCRIPTION OF MAIN COMPONENT SYMBOLS

Figure 1:
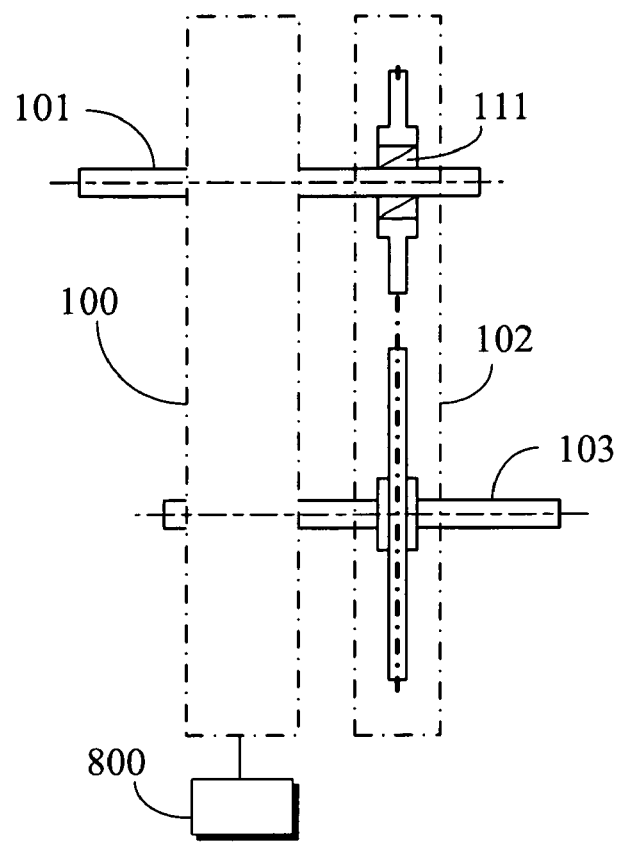
FIG. 1 is a structural schematic view of a preferred embodiment of the invention installed with a radial direction type unidirectional transmission device.

100: Continuous variable transmission device of different shafts type
101: Input shaft
102: Low shift transmission pulley train
103: Output Shaft
111: Unidirectional transmission device
302, 402: Speed change pulley train
800: Driving control device

DETAILED DESCRIPTION OF THE PREFERRED EMBODIMENTS

A continuously variable transmission device with a low shift transmission pulley train is either (a) passively operated by an axial driving force on the driving or driven pulley in response to operating torque or rotational speed controlled by manual manipulation or axially pre-pressed springs, to provide a continuously variable transmission function, or (b) actively operated by manual, electric, mechanical, hydraulic or pneumatic power to provide the continuous variable transmission function. and further referring to input preset operating modes, detected speeds and torques, etc. thereby to modulate and operate the speed ratio of the continuous variable transmission thereof.

Although the continuously variable transmission devices with different shafts convenient in operation because of the automatic speed ratio adjustment function, which adjusts the speed ratio in response to a rotational speed change of the driving pulley input shaft and a size of the loading torque at the loading side, such continuously variable transmission devices have the following imperfections:

1. Due to low transmittable power, the existing different-shafts-type continuously variable transmission device is only suitable for middle to small power applications;
2. Transmission efficiency of the continuously variable transmission device of different-shafts-type is too low;
3. Durability enhancement is required.

To overcome these disadvantages, the continuously variable transmission device of the invention is coupled with a low shift transmission pulley train having a fixed speed ratio and attached unidirectional transmission device installed between the input shaft and output shaft of the continuously variable transmission device, wherein if a decelerating type continuously variable transmission device is operated at maximum decelerating speed ratio or near maximum decelerating speed ratio status, or an accelerating type continuous variable transmission device is operated at minimum accelerating speed ratio or near minimum accelerating speed ratio status, then during high load operation, when the rotational speed of the driving pulley of the low shift transmission pulley train is lower than that of the input shaft in the same revolving direction, the rotational kinetic energy of the input shaft is transmitted through the unidirectional transmission device and the low shift transmission pulley train to drive the output shaft and further to drive the load, in which case, the power originally transmitted through the continuously variable transmission device of different-shafts-type is instead transmitted through the low shift transmission pulley train.

Preferably, the continuously variable transmission device with low shift transmission pulley train is constituted by the following:

As shown in FIG. 1, besides the relevant mechanisms in the conventional continuously variable transmission devices, the continuously variable transmission device with low shift transmission pulley train is further mainly constituted by:

A continuous variable transmission device of different-shafts-type 100 having different input and output shafts, of the continuously variable transmission device being a rubber belt type, metal belt type, chain type, electronic (ECVT) type, or friction disk type continuously variable transmission device, wherein a transmission speed ratio thereof can be either passively automatically modulated by following torque or following rotational speed, or actively modulated by applying a linear driving force generated either by an externally powered linear driving device or by a revolving driving device via a mechanical transmission that changes a spacing between the transmission V-belt grooves of both or either of the driving and driven pulleys.

Figure 2:
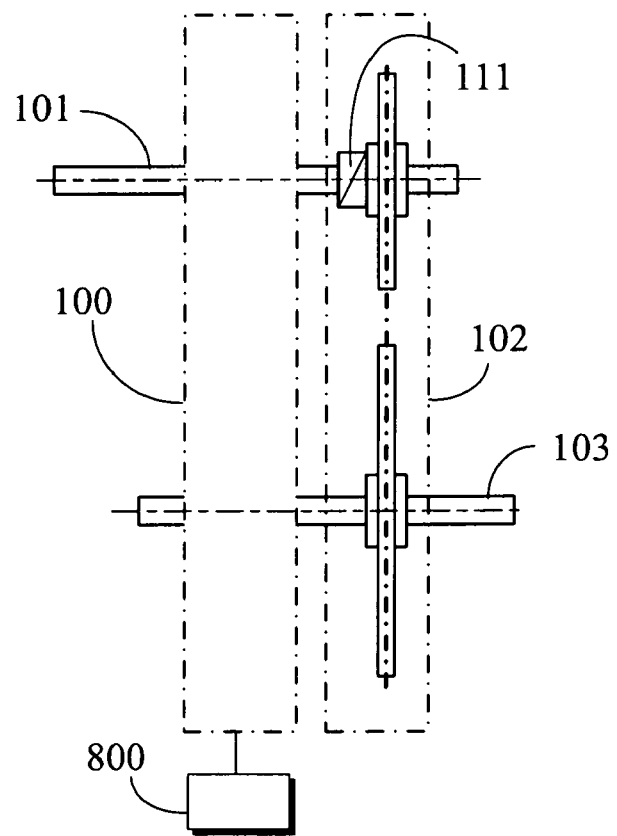
FIG. 2 is a structural schematic view of a preferred embodiment of the invention installed with an axial direction type unidirectional transmission device.
Figure 3:
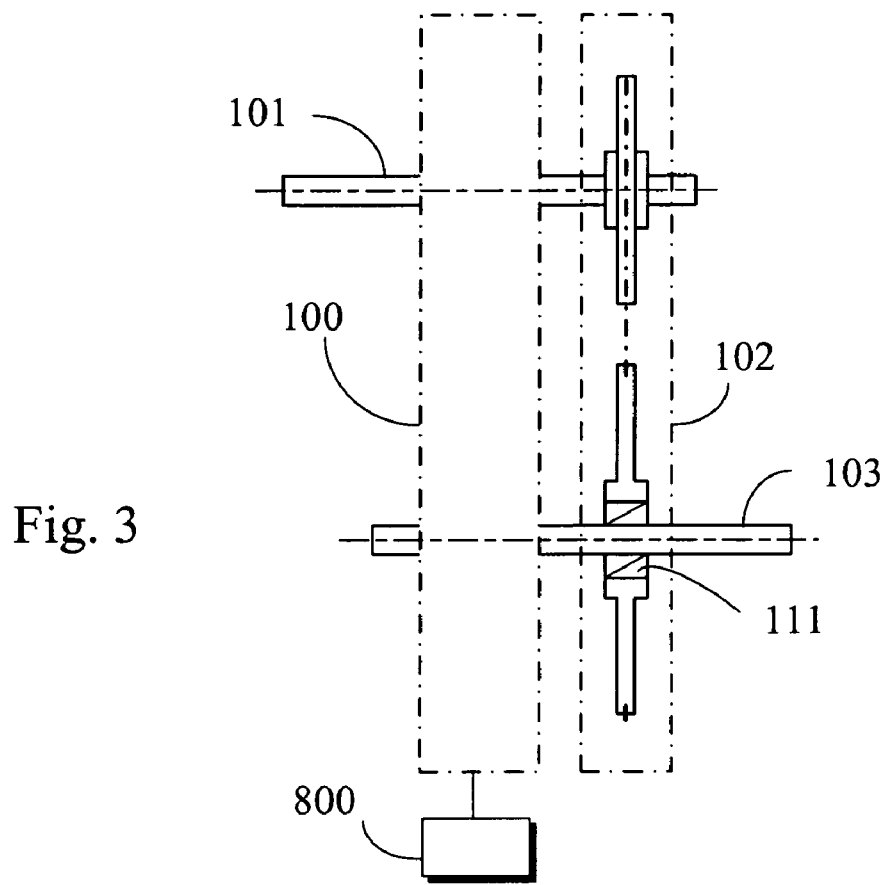
FIG. 3 is a structural schematic view of a preferred embodiment of the invention in which a unidirectional transmission device is installed between the driven pulley of the low shift transmission pulley train and the output shaft.
Figure 4:
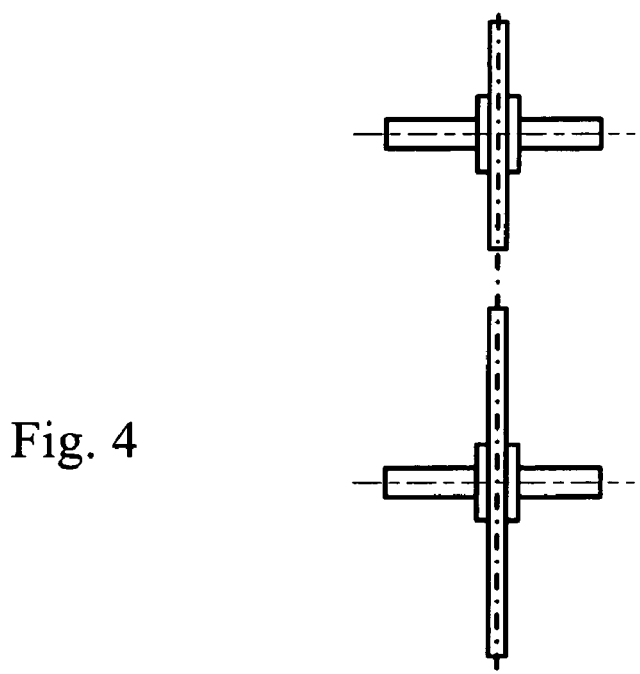
FIG. 4 is a structural schematic view in which the low shift transmission pulley train of the invention is constituted by a driving chain pulley, a driven chain pulley and a transmission chain.
Figure 5:
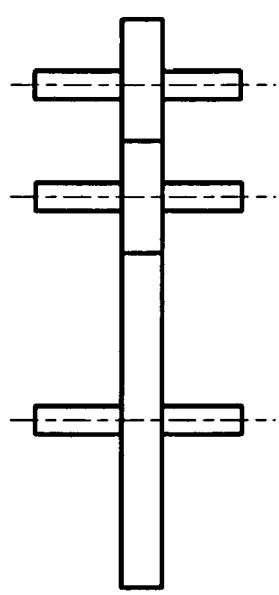
FIG. 5 is a structural schematic view in which the low shift transmission pulley train is constituted by a driving pulley, a middle driven pulley and a driven pulley.
Figure 6:
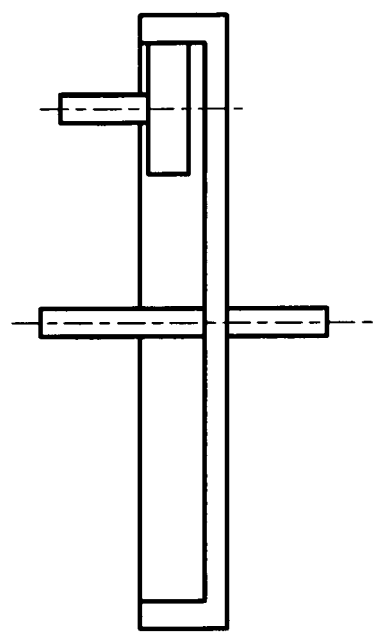
FIG. 6 is a structural schematic view in which the low shift transmission pulley train is constituted by a smaller outer diameter transmission pulley and a larger outer diameter inner transmission pulley.
Figure 7:
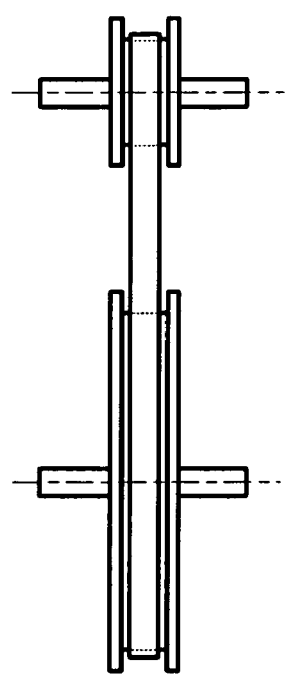
FIG. 7 is a structural schematic view in which the low shift transmission pulley train is constituted by a driving belt pulley, a driven belt pulley and a transmission belt.

An input shaft 101 in the form of a rotating shaft arranged to receive a rotational kinetic energy input, whereby the rotational kinetic energy is transmitted to the driving pulley of the continuously variable transmission device 100 and to the input end of the unidirectional transmission device 111;

An output shaft 103 in the form of a rotating shaft to provide a rotational kinetic energy output for driving the load, whereby the rotational kinetic energy from the driven pulley of the continuously variable transmission device 100 or from the driven pulley of the low shift transmission pulley train 102 is transmitted to the load;

A unidirectional transmission device 111 constituted by a unidirectional transmission device of radial direction type as illustrated in FIG. 1 or a unidirectional transmission device of axial direction type as illustrated in FIG. 2, including a unidirectional bearing with a unidirectional transmission function, a unidirectional clutch, or a unidirectional transmission mechanism or device, wherein the unidirectional transmission device 111 can be optionally installed as needed between the input shaft 101 and the driving pulley of the low shift transmission pulley train 102, or installed as needed between the driven pulley of the low shift transmission pulley train 102 and the output shaft 103 as shown in FIG. 3, and wherein the transmission direction of the unidirectional transmission device 111 is such that when the rotational speed of the input shaft 101 is higher than that of the driving pulley of the low shift transmission pulley train 102 in the same rotating direction, the rotational kinetic energy is transmitted to the driving pulley of the low shift transmission pulley train 102, and if not, the rotational kinetic energy from the input shaft 101 is not transmitted to the driving pulley of the low shift transmission pulley train 102;

A low shift transmission pulley train 102 including a driving pulley driven by the input shaft 101 and a driven pulley for driving the output shaft 103, wherein the driving pulley and driven pulley are rotate in the same direction, and the transmission speed ratio thereof provides a low shift transmission ratio relative to that of the continuously variable transmission device 100 during deceleration, the speed ratio relationship between the low shift transmission pulley train 102 and the continuously variable transmission device 100 being selected as follows:

1. The speed ratio of the driving pulley to drive the driven pulley of the low shift transmission pulley train 102 the speed ratio of the continuously variable transmission device of different shafts type 100 in low speed output; and The speed ratio of the continuously variable transmission device of different shafts type 100 in low speed output<the speed ratio of the driving pulley to drive the driven pulley of the low shift transmission pulley train 102<the speed ratio of the continuously variable transmission device of different shafts type 100 in high speed output, the low shift transmission pulley train 102 being constituted by the following:

1. a driving chain pulley, a driven chain pulley, and an attached transmission chain, as shown in FIG. 4; or 2. a driving pulley, a middle driven pulley and a driven pulley, said driving pulley, middle driven pulley and driven pulley including gears or friction pulleys, as shown in FIG. 5; or 3. an inner gear train or an inner friction pulley train comprising a smaller outer diameter transmission pulley and a larger outer diameter inner transmission pulley, as shown in FIG. 6; or 4. a driving belt pulley, a driven belt pulley and an attached transmission belt such as a canvas belt, a steel belt, or a chain belt, as shown in FIG. 7.

A driving control device 800 installed according to characteristics of the selected continuously variable transmission device of different shafts type 100, wherein the driving control device is provided with a driving power source constituted by an electric power supply unit, hydraulic oil pressure supply unit, pneumatic pressure supply unit and relevant electric power control unit, hydraulic oil pressure control unit, or pneumatic pressure control unit to actively control the transmission speed ratio of the continuously variable transmission device 100, wherein if an automatic torque-following, speed-ratio modulating mechanism, or a rotational speed-following, speed-ratio modulating mechanism is selected to serve as a passively operated continuously variable transmission device, the driving control device 800 does not need to be installed, and wherein if an actively operated continuous variable transmission device requiring an external power driving source for speed-ratio modulation is selected, the driving control device 800 is installed to actively control the speed ratio of the continuously variable transmission device 100.

In the continuously variable transmission device with low shift transmission pulley train as described above, the input shaft 101 of the continuously variable transmission device 100 is additionally installed with a driving pulley of a low shift transmission pulley train 102, and a unidirectional transmission device 111 further installed between the two. The transmission direction of the unidirectional transmission device 111 allows the continuously variable transmission device with the low shift transmission pulley train 102 to operate as follows: during higher load operation, when a decelerating type continuously variable transmission device 100 operates in a maximum deceleration speed ratio or a near maximum deceleration speed ratio status, or an accelerating type continuously variable transmission device operates in a minimum acceleration speed ratio or a near minimum deceleration speed ratio status, thereby causing the rotational speed of the driving pulley of the low shift transmission pulley train 102 to be lower than that of the input shaft 101 in the same rotating direction, the rotational kinetic energy of the input shaft 101 is transmitted through the unidirectional transmission device 111 and the low shift transmission pulley train 102 to drive the output shaft 103 and further to drive the load. In that situation, the power originally transmitted directly through the continuously variable transmission device is caused to be transmitted through the low shift transmission pulley train 102 to further drive the output shaft 103. During lower load operation, the power is directly transmitted through the continuous variable transmission device 100 to drive the output shaft 103.

If a unidirectional transmission device 111 is selected to be installed between the driven pulley of low shift transmission pulley train 102 and the output shaft 103, then during higher load operation, when a decelerating type continuously variable transmission device 100 operates in a maximum deceleration speed ratio or a near maximum deceleration speed ratio status, or an accelerating type continuously variable transmission device operates in a minimum acceleration speed ratio or a near minimum deceleration speed ratio status, thereby causing the rotational speed of the driven pulley of the low shift transmission pulley train 102 to be higher than that of the output shaft 103 in the same rotating direction, then the rotational kinetic energy is transmitted through the low shift transmission pulley train 102 and the unidirectional transmission device 111 to drive the output shaft 103 and further to drive the load. In that situation, the power originally transmitted directly through the continuously variable transmission device 100 is caused to be transmitted through the low shift transmission pulley train 102 to further drive the output shaft 103. During lower load operation, the power is directly transmitted through the continuously variable transmission device 100 to drive the output shaft 103.

Figure 8:
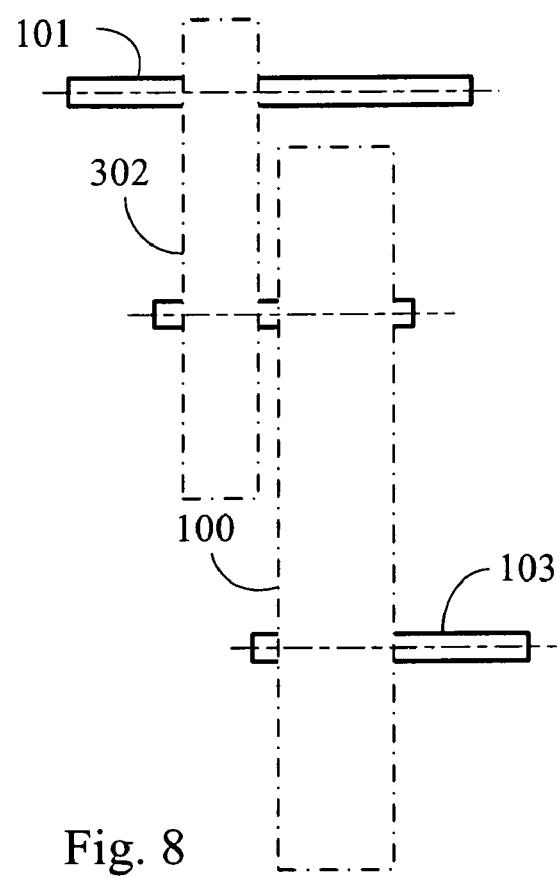
FIG. 8 is a structural schematic view of a preferred embodiment of the invention in which a speed change pulley train is installed between the input shaft and the driving pulley of the continuously variable transmission device.
Figure 9:
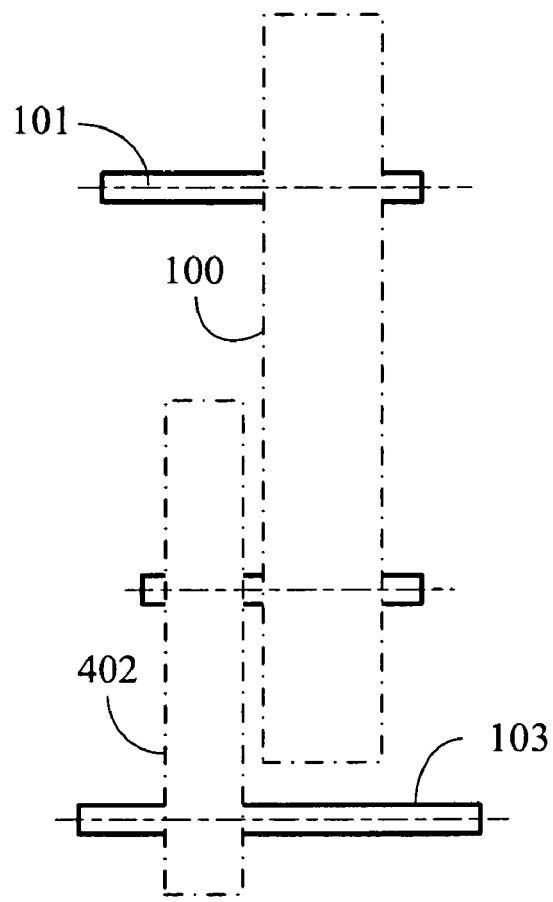
FIG. 9 is a structural schematic view of a preferred embodiment of the invention in which a speed change pulley train is installed between the output shaft and the driven pulley of the continuously variable transmission device.
Figure 10:
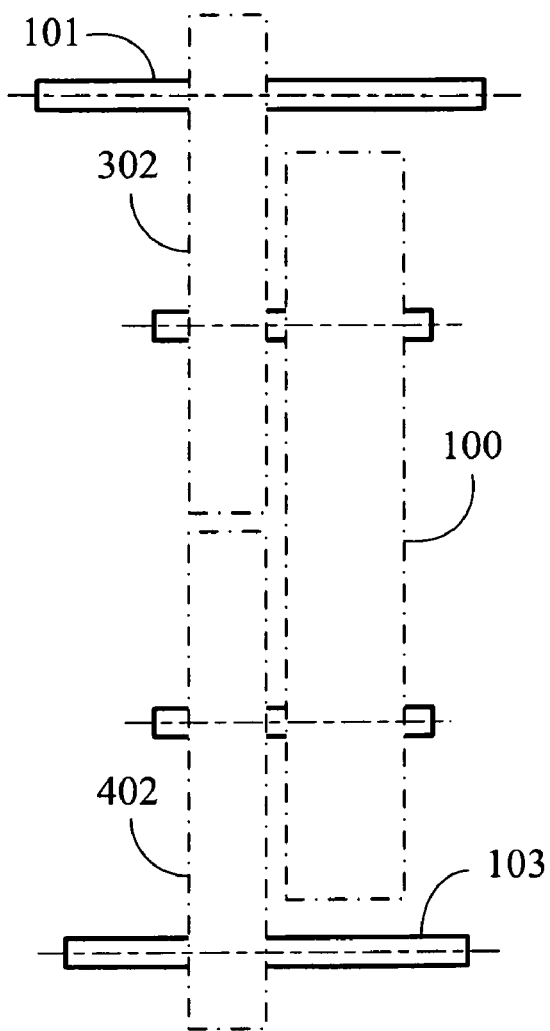
FIG. 10 is a structural schematic view of a preferred embodiment of the invention in which speed change pulley trains are installed between the input shaft and the driving pulley of the continuously variable transmission device and also between the output shaft and the driven pulley of the continuously variable transmission device.

When diameters of the driving pulley and the driven pulley in the continuously variable transmission device 100 are made more similar to each other to ensure better efficiency, a middle transmission pulley for accelerating speed ratio or decelerating speed ratio can be installed to satisfy the needs of the accelerating speed ratio or decelerating speed ratio in order to ensure better transmission efficiency, wherein the middle transmission pulley includes:

1. a speed change pulley train 302 further installed between the input shaft 101 and the driving pulley of the continuously variable transmission device 100 to change the total speed ratio of the input shaft 101 and the output shaft 103, and matched to the required revolving direction, as shown in FIG. 8; or 2. a speed change pulley train 402 further installed between the output shaft 103 and the driven pulley of the continuously variable transmission device 100 to change the total speed ratio of the input shaft 101 and the output shaft 103 and matched to a required rotating direction, as shown in FIG. 9; or 3. speed change pulley trains 302, 402 are simultaneously installed between the input shaft 101 and the driving pulley of the continuously variable transmission device 100 and between the output shaft 103 and the driven pulley of the continuously variable transmission device 100 to change the total speed ratio of the input shaft 101 through the continuously variable transmission device to the output shaft 103, and matched to required revolving direction, as shown in FIG. 10.

The low shift transmission pulley train of the continuously variable transmission device with low shift transmission pulley train can also be selected according to application requirements to include the following:

1. single stage low shift transmission pulley train of fixed speed ratio;

2. a multi-stage type low shift variable transmission pulley train of a manual shift or automatic transmission.

Input methods for supplying rotational kinetic energy to the input shaft 101 can be selected based on application requirements to include any of the following:

1. input shaft 101 may receive direct rotational power source input from a rotating power source such as an engine, motor or generator or input from a flywheel, wind power fan blades, gas or liquid turbines, or manual power, etc.;

2. the rotational power sources of item 1 supplied to the input shaft 101 may first be controlled by a clutching device before providing rotational kinetic energy output;

3. the rotational power sources of item 1 may further be supplied to the input shaft 101 through a speed change device with a fixed speed ratio, a stepped or stepless speed change device of a manual shift or automatic transmission, a fluid transmission device, or an electromagnetic eddy current transmission device to provide rotational kinetic energy output; and 4. the rotational power sources of item 1 may further be supplied to the input shaft 101 through a clutching device and a speed change device with a fixed speed ratio, a stepped or stepless speed change device of a manual shift or automatic transmission, a fluid transmission device, or an electromagnetic eddy current transmission device to provide rotational kinetic energy output.

The rotational kinetic energy output from the output shaft 103 can be selected according to application requirements to include any of the following:

1. the rotational kinetic energy output from the output shaft 103 may be directly used to drive the load;

2. the rotational kinetic energy output from the output shaft 103 may be output through a clutching device to further drive the load;

3. the rotational kinetic energy from the output shaft 103 may be output through a speed change device with a fixed speed ratio, a stepless or stepped speed change device of a manual shift or automatic transmission, a fluid transmission device, or an electromagnetic eddy current transmission device to further drive the load; and 4. the rotational kinetic energy output from the output shaft 103 may be output through a clutching device and a speed change device with a fixed speed ratio, a stepless or stepped speed change device of a manual shift or automatic transmission, a fluid transmission device, or an electromagnetic eddy current transmission device to further drive the load.

In practice, the continuously variable transmission device of different shafts type 100 and the low shift transmission pulley train 102 may be constructed as independently separated mechanical devices and combined afterwards for transmission, as an integral structure, or as a structure of a common integrated mechanical device and a common integrated casing.

In summary, a continuously variable transmission device with a low shift transmission pulley train is characterized in that during high load operation, the kinetic energy is transmitted through the low shift transmission pulley train 102 to drive the output shaft 103 and to further drive the load, thereby extending the service life of the continuously variable transmission device and promoting loading efficiency.

The invention claimed is:

1. A continuously variable transmission with a low shift transmission pulley train, comprising:

a continuously variable different-shaft-type transmission device (100) having a CVT driving pulley and a CVT driven pulley, said CVT driving pulley and CVT driven pulley having a continuously variable speed ratio; and a low shift transmission pulley train (102) including a low shift driving pulley driven by an input shaft (101) and a low shift driven pulley connected to an output shaft (103), said low shift driving pulley connected to a unidirectional transmission device (111) for engaging said low shift driving pulley with either said input shaft (101) or said output shaft (103), unidirectional transmission device (111) further disengaging said low shift driving pulley from either said input shaft (101) or said output shaft (103);

wherein said engagement and disengagement for said low shift driving pulley depends on a speed of said low shift driving pulley relative to said input shaft or output shaft such that said low shift transmission pulley train is engaged with said input shaft and said output shaft to drive said load during high load operation, and disengaged from one of said input shaft and output shaft during low load operation, wherein said low shift driven pulley rotate in a same direction and have a fixed speed ratio, and wherein said unidirectional input device (111) is installed in one of the following two positions:

(a) between the input shaft (101) and the low shift driving pulley;

(b) between the low shift driving pulley and the output shaft (103).

2. A continuously variable transmission as claimed in claim 1, further comprising a driving control device for controlling the speed ratio of the continuously variable transmission device.

3. A continuously variable transmission as claimed in claim 1, wherein said continuously variable transmission is passively controlled and does not require a driving control device (800).

4. A continuously variable transmission as claimed in claim 1, wherein a relationship between the fixed speed ratio of the low shift diving and driven pulleys and the continuously variable speed ratio is either:

(a) said fixed speed ratio of the low shift driving pulley to the low shift driven pulley is said continuously variable speed ratio in low speed output, or (b) said continuously variable speed ratio in low speed output is <said fixed speed ratio of the low shift driving pulley to the low shift driven pulley<said continuously variable speed ratio in high speed output.

5. A continuously variable transmission as claimed in claim 1, wherein when a rotational speed of the input shaft (101) is faster than that of the low shift driving pulley in the same direction or when the rotational speed of the driven pulley is higher than the rotational speed of the output shaft (103) in the same direction, said unidirectional transmission device (111) engages to drive said output shaft (103) via said low shift pulley train (102), and when the rotational speed of the input shaft (101) is lower than a rotational speed of the low shift driving pulley or the rotational speed of the low shift driven pulley is higher than the rotational speed of the output shaft (103), said unidirectional transmission device (111) is in no load operation.

6. A continuously variable transmission as claimed in claim 1, wherein when a rotational speed of the low shift driven pulley is higher than a rotational speed of the output shaft (103) in the same direction, said continuously variable transmission device drives said output shaft (103) when a load is lower is lower than a preset value, and said low shift transmission pulley train (102) drives said output shaft when a load is higher than a preset value.

7. A continuously variable transmission as claimed in claim 1, wherein when a torque differential between the output shaft (103) and the CVT driven pulley, or between the input shaft (101) and the CVT driving pulley exceeds a preset value, said torque limiting clutching device (212) is closed to supply kinetic energy from said CVT driven pulley to said output shaft (103), and wherein when a rotational speed of the output shaft is lower than a preset speed and a torque differential between the input shaft (101) and the output shaft (103), said unidirectional transmission (111) engages to transmit kinetic energy from said input shaft (101) through said low shift gear train (102) to said output shaft (103).

8. A continuously variable transmission as claimed in claim 1, wherein:
   said unidirectional transmission device is installed between the input shaft (101) and the low shift driving pulley, such that when said continuously variable transmission device (100) operates at a maximum deceleration speed ratio, or at a minimum acceleration speed ratio, and when the rotational speed of the low shift driving pulley is lower than a rotational speed of the input shaft (101) in the same revolving direction, the unidirectional transmission (111) engages to transmit kinetic energy from the input shaft (101) to the output shaft (103), or
   said unidirectional transmission device is installed between the low shift driven pulley and the output shaft (103), such that when said continuously variable transmission device (100) operates at a maximum deceleration speed ratio, or at a minimum acceleration speed ratio, and when the rotational speed of the low shift driven pulley is higher than a rotational speed of the input shaft (101) in the same revolving direction, the unidirectional transmission (111) engages to transmit kinetic energy from the input shaft (101) to the output shaft (103).

9. A continuously variable transmission as claimed in claim 1, wherein said continuously variable transmission device is one of the following types of continuously variable transmission: rubber belt, metal belt, chain, electronic (ECVT), or friction disc type of continuously variable transmission device.

10. A continuously variable transmission as claimed in claim 1, wherein the speed ratio of the continuously variable transmission device is automatically passively modulated by following torque or rotational speed.

11. A continuously variable transmission as claimed in claim 1, wherein the speed ratio of the continuously variable transmission device is actively modulated by applying a linear driving force generated by an external linear driving device or a revolving driving device via a mechanical transmission device to change a spacing between V-belt grooves of either or both of the CVT driving pulley or the CVT driven pulley.

12. A continuously variable transmission as claimed in claim 1, wherein the unidirectional transmission device (111) is a radial or axial type unidirectional transmission device including a unidirectional bearing, clutch, or transmission mechanism.

* * * * *